Patented Oct. 12, 1926.

1,602,549

UNITED STATES PATENT OFFICE.

AMÉ PICTET, OF GENEVA, SWITZERLAND, ASSIGNOR TO THE SOCIETY OF CHEMICAL INDUSTRY IN BASLE, OF BASEL, SWITZERLAND.

DISACCHARIDE ANHYDRIDES AND POLYMERIZATION PRODUCTS THEREOF AND PROCESS OF MAKING SAME.

No Drawing. Application filed March 6, 1925, Serial No. 13,635, and in Switzerland March 14, 1924.

The present invention relates to disaccharide-anhydrides and polymerization products thereof. It comprises the process of manufacture thereof in pure form, and new products, especially the new compounds derived from mixed disaccharides such as sucrose, lactose and the like. The new process consists in heating disaccharides, as for instance sucrose, lactose, and the like under reduced pressure and at temperatures exceeding 170° C.

It is known that by heating sucrose at ordinary pressure, amorphous, more or less colored products are obtained, which are designated by the name of caramel. Gélis (cf. Annales de Chimie (3) 52,352, (1858), studied these products and succeeded in isolating from them the caramelan, the caramelen and the caramelin, brown to black compounds distinguished, on the one hand, from the sucrose, on the other hand from each other by their different degrees of anhydrization. Gélis gives to these three compounds the following formulas: caramelan $C_{12}H_{18}O_9$, caramelen $C_{36}H_{50}O_{25}$, caramelin $C_{96}H_{102}O_{51}$. The melting point which he indicates for caramelan is about 100° C. Stolle (cf. Chemisches Centralblatt, 1899, II, 1021), Cunningham and Dorée (cf. Journal of the Chemical Society, London, 111, 589, (1917)) obtained later the caramelan in a somewhat purer state with the melting point 134–136° C. But also these authors describe the compound as a brown substance.

I have found that by heating sucrose under very reduced pressure at 170–200°, not only the above named substances, especially the caramelan, are obtained in a much purer form, but quite new compounds are produced, which are not obtainable by heating sucrose at ordinary pressure. Thus, for instance, by heating sucrose at 185–190° C. under a pressure of 12–15 mm. until a loss of weight of 5% occurs, a colorless and well defined new compound of the formula $C_{12}H_{20}O_{10}$ is obtained, which, in contradistinction from the above named compounds, is formed by loss of only one molecular proportion of water from the sucrose molecule. In analogy to the anhydrides glucosan, levulosan, levoglucosan, obtained also by loss of one molecular proportion of water in saccharides, the new compound has been called saccharosan.

If sucrose or saccharosan are heated furthermore under reduced pressure at 185–190° until a loss of 10% of weight (calculated from sucrose) occurs, there is obtained, in the main, a feebly yellow colored anhydride, which, according to analysis and cryoscopic determination, corresponds with the formula; $C_{24}H_{36}O_{18}$. According to its properties, this product seems to be a pure caramelan, melting at 144–145°, i. e. considerably higher than indicated hitherto for caramelan. As for its solubility and other properties, the product behaves like caramelan.

By heating saccharosan at reduced pressure until it has lost 20% of its weight, a compound corresponding with the formula $C_{36}H_{50}O_{25}$ is obtained, which appears to be identical with caramelen.

Lactose, when heated under reduced pressure behaves similar to sucrose. First a colorless anhydride of the formula $C_{12}H_{20}O_{11}$ is formed designated as lactosan. By further heating to 200° under reduced pressure, a yellow colored product is obtained, which, according to analysis and molecular weight determination, represents a polymerization product of the lactosan, the tetralactosan $(C_{12}H_{20}O_{10})_4$. Analogous polymerization products may be obtained from sucrose.

Like sucrose and lactose other disaccharides may also be converted into their anhydrides and polymerization products.

The anhydrides of the disaccharides and their polymerization products may be employed as such for pharmaceutical purposes or as parent materials for the manufacture of technical and pharmaceutical products.

*Example 1.*

100 grams of cane sugar or beet sugar, previously powdered and dried, are introduced into a vessel which is evacuated until the pressure within it is 12–15 mm. of mercury. The vessel is then heated in an oven or suitable bath to 185–190° C. The sugar first melts, then enters into a sort of ebullition due to disengagement of water vapour. The liquid remains perfectly limpid and colourless. The heating is continued until the material has lost 5 per cent of its weight, which generally happens in the course of 40-50 minutes. The mass is then allowed to cool and powdered. Analysis and cryoscopic determination of molecular weight indicate the formula $C_{12}H_{20}O_{10}$. The product constitutes a colorless powder, amorphous, hygroscopic and of a taste which is both sweet and bitter. It melts at 94-95° C. and is very easily soluble in water, methylalcohol and pyridine, fairly soluble in hot ethylalcohol, scarcely soluble or insoluble in acetone, ether, chloroform and benzol.

*Example 2.*

100 parts of sucrose are heated at a pressure of 12-15 mm. at 185-190° until they have lost 10% of their weight which occurs after about one hour. The mass is allowed to cool and the product pulverized; it corresponds, according to the analysis and the molecular weight determination, with the formula $C_{24}H_{36}O_{18}$. The compound forms a light yellow powder of bitter taste, melting at 144-145°, which is less hygroscopic than saccharosan, very easily soluble in water, readily soluble in cold methylalcohol as well as in hot pyridine and in hot acetic acid, insoluble in ethyl alcohol, ether, acetone, chloroform and benzene. It is dextrorotatory in aqueous solution.

The same product is obtained by heating saccharosan under reduced pressure until it loses a further molecule of water.

*Example 3.*

100 parts of sucrose are heated at a pressure of 12-15 mm. until the material has lost 20% of its weight. The product thus obtained forms a brownish powder, melting at 204-205° with pronounced bitter taste; analysis and molecular weight determination indicate the formula $C_{36}H_{50}O_{25}$; the compound is very easily soluble in water, but insoluble in ordinary organic solvents; owing to its composition and properties it is identical with the caramelen of Gélis.

*Example 4.*

100 parts of lactose are heated as indicated in Example 1, at a pressure of 12-15 mm., first to 120-130° to eliminate the water of crystallization, then to 185° and left at this temperature until the total loss of weight is 10%, which requires about 10 hours. The mass is then allowed to cool, the product pulverized and boiled for 1/4 of an hour with alcohol of 90% strength, filtered and dried. Analysis and cryoscopic determination of molecular weight indicate the formula $C_{12}H_{20}O_{10}$. The lactosan forms a colorless, amorphous, somewhat hygroscopic powder, melting at 200-202°, which is very easily soluble in water even in the cold, fairly easily soluble in boiling acetic acid and pyridine, insoluble in the remaining organic solvents. It is dextrorotatory in aqueous solution. It reduces Fehling's solution and discolors potassium permanganate. By boiling with water the lactosan is reconverted into lactose.

*Example 5.*

100 parts of lactosan are heated for a short time to 200° C. at a pressure of 12-15 mm. A polymerization product is formed of which analysis and molecular weight determination indicate the formula $(C_{12}H_{20}O_{10})_4$. The product melts at 245-246° with decomposition. It is readily soluble in water, insoluble in all organic solvents and does not reduce Fehling's solution.

What I claim is:

1. Process for the manufacture of anhydrides of disaccharides by heating disaccharides under reduced pressure.

2. Process for the manufacture of anhydrides of disaccharides by heating disaccharides at a temperature above 170° C. and under reduced pressure.

3. Process for the manufacture of anhydrides of mixed disaccharides by heating mixed disaccharides under reduced pressure.

4. Process for the manufacture of anhydrides of mixed disaccharides by heating mixed disaccharides at a temperature above 170° C. and under reduced pressure.

5. Process for the manufacture of anhydrides of sucrose by heating sucrose under reduced pressure.

6. Process for the manufacture of anhydrides of sucrose by heating sucrose at a temperature above 170° C. and under reduced pressure.

7. As new products the monoanhydrides of mixed disaccharides, constituting colorless, amorphous, powders which are very easily soluble in water.

8. As a new product the herein described monoanhydride of sucrose, constituting a colorless amorphous hygroscopic powder, melting at 94-95° C. and easily soluble in water, methylalcohol and pyridine, fairly soluble in hot ethylalcohol.

In witness whereof I have hereunto signed my name this 20th day of February, 1925.

AMÉ PICTET.